United States Patent [19]

Hagström

[11] Patent Number: 4,854,629
[45] Date of Patent: Aug. 8, 1989

[54] SUN VISOR FOR MOTOR VEHICLES AND PROCESS FOR ITS MANUFACTURE

[75] Inventor: Robert Hagström, Malung, Sweden

[73] Assignee: Autopart Sweden AB, Malung, Sweden

[21] Appl. No.: 102,041

[22] Filed: Sep. 28, 1987

[30] Foreign Application Priority Data

Oct. 6, 1986 [SE] Sweden ............................... 8604243

[51] Int. Cl.$^4$ ............................................... B60J 3/02
[52] U.S. Cl. ..................... 296/97.13; 16/321
[58] Field of Search ............. 296/97 K, 97 H; 16/262, 16/255, 277, 319, 321 X

[56] References Cited

U.S. PATENT DOCUMENTS

| | | | |
|---|---|---|---|
| 4,428,612 | 1/1984 | Viertel et al. | 296/97 K |
| 4,469,367 | 9/1984 | Kuttler et al. | 296/97 K |
| 4,617,699 | 10/1986 | Nakamura | 296/97 K |

FOREIGN PATENT DOCUMENTS

| | | |
|---|---|---|
| 2450709 | 10/1980 | France . |
| 2469307 | 5/1981 | France . |
| 2149365 | 6/1985 | United Kingdom . |

*Primary Examiner*—Robert R. Song
*Attorney, Agent, or Firm*—Young & Thompson

[57] ABSTRACT

The invention relates to a sun visor for motor vehicles consisting of a foamed plastics plate, in which a sheet metal element serving as a main bearing and as a snap spring, a shaft holder for a second bearing and a stiffening metal wire frame are embedded. The wire frame is made of a single wire, the ends of which meet and are fixed in the element serving as a bearing and as a snap spring.

5 Claims, 1 Drawing Sheet

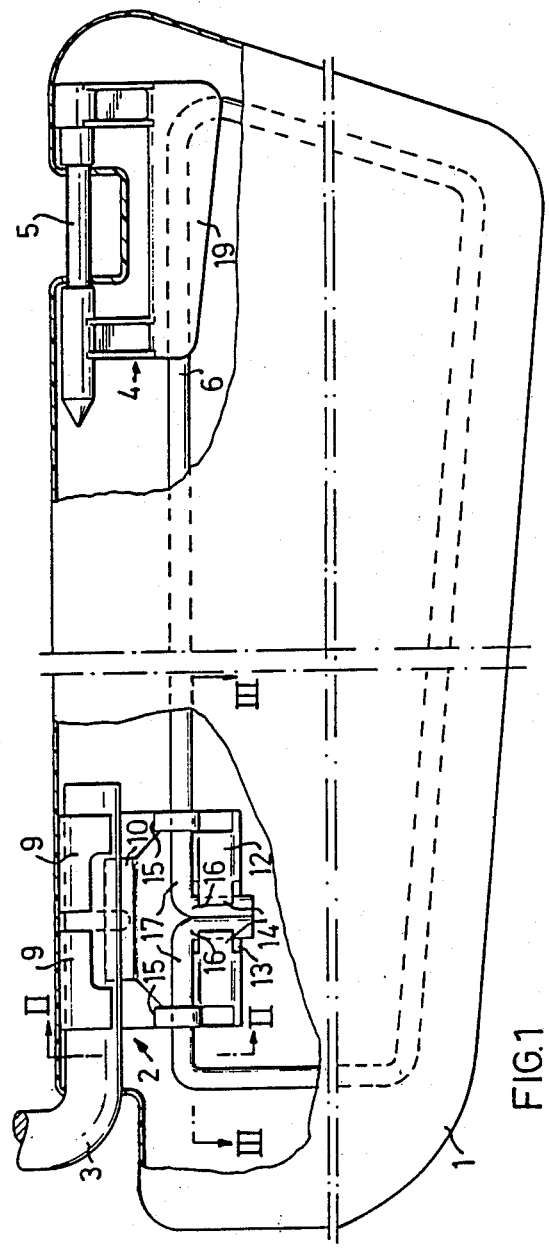
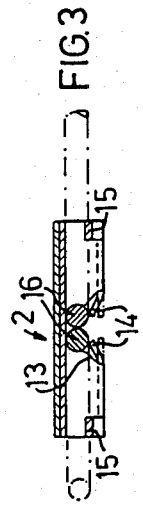
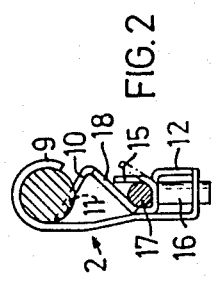
FIG.1
FIG.2
FIG.3

SUN VISOR FOR MOTOR VEHICLES AND PROCESS FOR ITS MANUFACTURE

The present invention relates to a sun visor for motor vehicles, comprising a plate preferably consisting of a compressible material such as foamed plastic with a stiffening metal wire frame, a main bearing joined to the wire frame for a main shaft and a shaft holder for a second bearing as well as a spring device with at least one spring tongue in contact with a portion of the main shaft, said portion having a non-circular cross section. The invention also relates to a process for manufacture of such a sun visor.

A sun visor of the above mentioned type is disclosed in GB 2 149 365, in which the main bearing consists of a moulded plastics body serving as a holder for a metal spring clamp, which in turn, together with the bearing, serves as a holder for one end of a wire frame. The main bearing is joined via a spacer shaft to the shaft holder, which holds the other end of the wire frame.

Said five components are assembled so that they can be handled and placed in the mould as a unit, which, among other things, makes extensive automation of the manufacture possible, for example by using a robot to place the components in the mould tool.

The assembly of the components must, however, be done by skilled hands, the mounting of the spring clamp on the main bearing and the insertion of the wire frame end between the legs of the spring clamp being the most demanding steps in this case.

Since sun visors, like most other motor vehicle parts, are manufactured in very large quantities, a reduction in the number of components used, also simplifying the assembly work, can result in a substantial reduction in the total manufacturing cost.

The purpose of the present invention is to achieve a sun visor of the type described above by way of introduction, which can be manufactured with fewer and simpler components than the visor described above without adversely affecting appearance or function.

This is achieved according to the invention by the main bearing and the spring device being made of metal as a unit having means for fixing mutually adjacent ends of the wire frame to the same.

This design reduces the number of components from five to three by eliminating the spacer shaft and a separate main bearing. The wire frame, which is only broken at one place, assumes the function of the spacer shaft while the functions of the main bearing and the spring clamp are integrated in a single unit of metal which is provided with a spring tongue and a bearing member for the main shaft. This unit also serves as a joint for the wire frame and thus serves no less than three functions.

In a process for manufacturing a sun visor according to the invention, a metal wire is bent into a frame, the ends of which meet in the area of an element serving as a main bearing and a spring device, that the ends are inserted behind fixing tongues of this element, whereafter the fixing tongues are deformed to fix the wire ends to the element, so that a closed frame is formed, and that the holder for the shaft is clamped onto the wire frame with the aid of a pair of flanges formed on the holder, thereby forming a coherent unit ready for moulding.

The invention will be described in more detail below with reference to an example shown in the accompanying drawing.

FIG. 1 shows a plan view of a partially cut-away sun visor according to the invention, FIG. 2 shows a section along the line I—II in FIG. 1, and FIG. 3 shows a section along the line III'III in FIG. 1.

The sun visor shown in FIG. 1 consists of an oblong plate 1 of moulded foamed plastic. An element 2 serving as a main bearing and as a spring clamp is embedded at one end of one longitudinal side of the plate 1. A main shaft 3 is rotatably journalled in the element 2. At the opposite end of the plate there is embedded a U-shaped holder 4 for a shaft 5. Furthermore, a stiffening metal wire frame 6 is embedded in the plate. The frame joins the element 2 to the holder 4 and increases the resistance of the sun visor to twisting.

The element 2 serving as a main bearing and as a spring clamp is formed from a signle piece of sheet metal which has been stamped and bent to the shape shown in the figures. The element 2 thus has a pair of arcuate bearing halves 9 for holding the main shaft 3.

Between the bearing halves 9 there is a spring tongue 10 which presses, in a known manner, against a bevelled portion 11 (FIG. 2) on the main shaft 3. By virtue of the fact that the shaft cross section under the bearing halves is circular, there is, due to the bevelling therebetween, one snapping position per revolution.

The element 2 has in its lower area beneath the bearing halves 9 and the spring tongue 10 a boxed portion 12 (FIG. 2), in the middle of which there is an opening 13 with two stamped out fixing tongues 14 directed towards each other. A pair of additional fixing tongues 15 are also stamped out at the extreme ends of the portion 12. These tongues 15 are bent up towards the spring tongue 11.

As can be seen in FIG. 1, the wire frame 6 is formed from a single metal wire which is bent so that end portions 16 with 90° bends meet in the opening 13 in the element 2. Prior to assembly of the element 2 and the wire frame 6, the tongues 14 and 15 assume the positions shown with dashed lines in FIGS. 2 and 3, thus allowing the wire frame, unimpeded by the tongues, to be placed in the position shown in FIG. 1, in which the end portions 16 of the wire extend down into the opening 13 behind the tongues 14, while the wire end portions 17 parallel to the shaft lie between the tongues 15 and a portion 18 of the element 2, from which the spring tongue 11 is bent in. After the wire frame has been placed in the position shown, the tongues are deformed so that they assume the positios shown with solid lines in FIGS. 2 and 3. The wire frame 6 is now fixed against both longitudinal displacement and rotation relative to the element 2.

The shaft holder 4 is a moulded plastics body with a pair of flanges 19 extending down on both sides of the wire frame 6. The distance between the flanges 19 is so adapted to the wire diameter of the frame that the flanges 19 clamp the wire between them.

When the wire frame 6 has been fixed in the manner described above to the element 2 and the shaft holder 4 has been clamped onto the wire frame, the three components can be placed as a unit in the mould for moulding the foamed plastic.

By virtue of the fact that the design according to the invention involves a reduction of the number of components involved, the assembly process can be simplified and this alone makes it possible to reduce manufacturing cost. By virtue of the fact that the special design of the element 2 also makes it possible to produce it from a single piece of sheet metal by a simple stamping and bending process, it also can be produced at lower cost than the total cost for the known separate main bearing and spring means, thus further reducing the total cost of the sun visor.

I claim:

1. Sun visor for motor vehicles, comprising a plate of a compressible material with a stiffening metal wire frame, a main bearing joined to the wire frame for a main shaft and a shaft holder for a second bearing as well as a spring device with at least one spring tongue in contact with a portion of the main shaft, said portion having a non-circular cross section, characterized in that the main bearing and the spring device are made of metal of one-piece construction having means for fixing mutually adjacent ends of the wire frame to the unit, the wire frame having abutting, bent end portions, which are fixed by tongues gripping the wire, said tongues being stamped-out portions of the metal unit of one-piece construction.

2. Sun visor according to claim 1, characterized in that the bent end portions of the wire frame extend perpendicular to the direction of the main shaft and are fixed adjacent to each other by a pair of tongues directed towards each other and that at least one additional pair of tongues grips a wire frame portion running parallel to the main shaft.

3. Sun visor according to claim 1, characterized in that the wire frame is unbroken except within the bearing and spring unit and that the shaft holder for the other bearing has a pair of flanges on either side of the wire frame, which clamp the wire between them.

4. Sun visor according to claim 1, characterized in that the bearing and spring unit is formed from a metal plate which is stamped and bent, so that firstly a pair of arcuate bearing portions are formed on either side of a spring tongue and secondly two pairs of fixing tongues are formed for fixing the wire frame to the unit.

5. Process for manufacture of a sun visor of the type comprising an oblong plate of a moulded foamed plastics material, in which plate there are embedded a main bearing with a clamped spring for a main shaft, a holder for a shaft for a second bearing and a stiffening metal wire frame, characterized in that a metal wire is bent into a frame, the ends of which meet in the area of an element serving as a main bearing and a spring device, that the ends are bent into parallelism with eachother and are inserted behind fixing tongues of this element, whereafter the fixing tongues are deformed to fix the wire ends to the element, so that a closed frame is formed, and that the holder for the shaft is clamped onto the wire frame with the aid of a pair of flanges formed on the holder, thereby forming a coherent unit ready for moulding.

* * * * *